United States Patent
Kizaki

(10) Patent No.: US 7,829,233 B2
(45) Date of Patent: Nov. 9, 2010

(54) FUEL CELL SYSTEM AND METHOD FOR JUDGING FUEL GAS LEAK IN A FUEL CELL SYSTEM

(75) Inventor: Mikio Kizaki, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 501 days.

(21) Appl. No.: 11/920,701

(22) PCT Filed: Jul. 28, 2006

(86) PCT No.: PCT/JP2006/315449

§ 371 (c)(1),
(2), (4) Date: Nov. 19, 2007

(87) PCT Pub. No.: WO2007/018132

PCT Pub. Date: Feb. 15, 2007

(65) Prior Publication Data

US 2009/0047553 A1  Feb. 19, 2009

(30) Foreign Application Priority Data

Aug. 9, 2005  (JP) .............................. 2005-231368

(51) Int. Cl.
H01M 8/04 (2006.01)
(52) U.S. Cl. .................. 429/443; 429/444; 429/448
(58) Field of Classification Search ............... 429/22, 429/25, 24, 34, 13, 17, 12; 702/58; 340/635
See application file for complete search history.

(56) References Cited

U.S. PATENT DOCUMENTS 5,763,765 A * 6/1998 Lamont et al. ............... 73/40.7

6,492,043 B1 * 12/2002 Knights et al. ............... 429/13

FOREIGN PATENT DOCUMENTS

| DE | 11 2004 000 811 T5 | 3/2006 |
|----|---|---|
| JP | 05-205762 * | 8/1993 |
| JP | 8-185878 A | 7/1996 |
| JP | 8-329965 A | 12/1996 |
| JP | 10-103547 A | 4/1998 |
| JP | 2002-298890 A | 10/2002 |
| JP | 2003-45466 A | 2/2003 |
| JP | 2003-308866 A | 10/2003 |
| JP | 2004-95425 A | 3/2004 |

(Continued)

*Primary Examiner*—Raymond Alejandro
(74) *Attorney, Agent, or Firm*—Kenyon & Kenyon LLP

(57) ABSTRACT

A high-precision gas leak judgment comparable to that when the fuel cell is operating normally is achieved even when a fuel cell is restarted. A gas leak judgment unit (for example ECU 13) for judging gas leak in a closed space formed in a fuel gas system refers to a gas leak judgment value based on pressure change in the closed space detected by a pressure sensor to judge gas leak and, in addition, varies the fuel gas leak judgment level in response to nitrogen concentration in a fuel electrode. The varying of gas leak judgment level in response to the nitrogen concentration takes into account a temporary rise in the nitrogen concentration in the fuel electrode that occurs when a fuel cell stack is restarted and, in this case, it is preferable that the gas judgment value be altered in response to the nitrogen concentration.

5 Claims, 5 Drawing Sheets

FOREIGN PATENT DOCUMENTS

| | | |
|---|---|---|
| JP | 2004-192919 A | 7/2004 |
| JP | 2004-319332 A | 11/2004 |
| JP | 2005-11703 A | 1/2005 |
| JP | 2006-185886 A | 7/2006 |
| WO | WO 2005/069417 A2 A | 7/2005 |

* cited by examiner

| MAP1 | | | | | |
|---|---|---|---|---|---|
| N(%) | 0 | 20 | 40 | 60 | 80 |
| C(L/m) | 30 | 25 | 20 | 15 | 10 | ated result of pressure change, the fuel gas leak in
FUEL CELL SYSTEM AND METHOD FOR JUDGING FUEL GAS LEAK IN A FUEL CELL SYSTEM This is a 371 national phase application of PCT/JP2006/315449 filed 28 Jul. 2006, claiming priority to Japanese Patent Application No. 2005-231368 filed 09 Aug. 2005, the contents of which are incorporated herein by reference.

BACKGROUND

The present invention relates to a fuel cell system and to a method for judging fuel gas leak in a fuel cell system. More particularly, the present invention relates to an improved technology for detecting and judging fuel gas leak in a fuel cell system.

Accurate detection of fuel gas leak and judgment of the particulars thereof (hereinafter expressed simply as "judgment") is absolutely essential in fuel cell systems. A technology in which a plurality of closed spaces are formed by shutoff valves or the like arranged in a fuel gas circulation supply line (hereinafter referred to also as a "fuel gas line") comprising a fuel cell and in which the judgment of fuel gas leak is based on either pressure change (for example, speed of pressure) in this closed spaces or detection of the front-rear differential pressure of the shutoff valves or the like has been proposed (for example, see Japanese Unexamined Patent Application No. H8-329965) to satisfy this requirement.

However, there is a failing in the fuel gas leak judgment technology described above when the fuel cell system is restarted. That is to say, as a result of a phenomenon that occurs when the fuel cell system is stopped and then started again in which the nitrogen concentration in the fuel electrode side temporarily rises above the nitrogen concentration when the fuel cell is operating normally due to cross leak and the fuel gas leak decreases, the gas leak amount is sometimes underestimated.

SUMMARY

It is an object of the present invention to provide a fuel cell system in which a high-precision gas leak judgment comparable to that when the fuel cell is operating normally can be also performed when the fuel cell is restarted, and a method for judging fuel gas leak in this fuel cell system.

The inventors of the present invention investigated the particulars of the conventional art. A lack of fuel gas leak judgment precision due to an underestimation of the fuel gas leak amount as described above occurred in attempts to judge fuel gas leak on the basis of pressure change in the closed spaces. In further investigations carried out in this regard, because a temporary increase in gas pressure in the fuel cell (including a state in which it is was temporarily increasing) was found to occur when the fuel cell was restarted, a comparison of the fuel gas leak amount detected when the fuel cell was started and the fuel gas leak amount detected in a state when, following starting of the fuel cell, an increase in hydrogen concentration had occurred subsequent to thorough purging indicated that the latter of these two fuel gas leak amounts was greater, and this was thought to be linked to the underestimation of fuel gas leak amount when the fuel cell is started.

Thereupon, the following matter was considered in a further and more detailed investigation carried out by the inventors of the present invention, That is to say, if an abnormal gas leak attributable to, for example, a hole occurring a pipe were to occur in a state in which the amount of nitrogen flowing into the fuel electrode side had increased due to cross leak and the pressure in the closed spaces on the fuel electrode side had risen, this gas leak would be underestimated because of the minimal pressure change. In view of the above, a technology for precisely judging fuel gas leak premised on the phenomenon that is peculiar to restart was regarded as essential. Further investigations carried out by the inventors of the present invention focusing on the nitrogen gas contained in the closed space of the fuel cell led to the knowledge that was related to a resolution of the problem.

The present invention, which is based on this knowledge, constitutes a method for judging fuel gas leak in a fuel cell system in which pressure change in a closed space formed in the fuel electrode side of the fuel cell is detected and in which referring to a predetermined gas leak judgment value based on the detected result of pressure change, the fuel gas leak in this closed space is judged, the method comprising a step of varying of fuel gas leak judgment level in response to the nitrogen concentration in the fuel electrode to perform the fuel gas leak judgment.

That is to say, the method for judging fuel gas leak pertaining to the present invention takes into account the nitrogen concentration in the fuel electrode side and performs a desired correction in response thereto. In other words, the fuel gas leak judgment precision is improved by varying the fuel gas leak judgment level in response to the nitrogen concentration in the fuel electrode. This takes into account the temporary rise in the nitrogen concentration in the fuel electrode that occurs when the fuel cell is restarted, the desired correction being performed on the gas fuel leak judgment value in response to this nitrogen concentration. In other words, the fuel gas leak judgment level is varied in response to the nitrogen concentration in the fuel electrode.

In this case, it is preferable for the fuel gas leak judgment level to be varied by altering the gas leak judgment value in response to the nitrogen concentration. An underestimation of gas leak amount when a temporary high concentration of nitrogen exists in the fuel electrode side when the fuel cell is restarted due to the phenomenon of cross leak can be avoided by, as in the present invention, utilizing an altered gas leak judgment value. This allows a condition of temporary rise in the nitrogen concentration in the fuel electrode to be dealt with.

The nitrogen concentration in the fuel electrode can be estimated on the basis of at least one of either the permeated amount of fuel gas that has permeated an electrolyte film of the fuel cell and leaked to the air electrode side, or the leave time from when the operation of the fuel cell is stopped to when it is restarted.

The nitrogen concentration in the fuel electrode can also be estimated on the basis of temperature of the fuel cell stack when operation of the fuel cell is stopped, the fuel electrode pressure when the fuel cell is restarted, and the leave time from when the operation of the fuel cell is stopped until it is restarted.

Furthermore, the present invention constitutes a fuel cell system comprising a fuel cell for generating power subsequent to being supplied with a fuel gas, a fuel gas system for supplying and exhausting a fuel gas to and from the fuel cell, a pressure regulating valve provided in the fuel gas system, a pressure sensor for detecting the pressure in a closed space formed in the fuel gas system, and a gas leak judgment unit for judging the gas leak in the closed space formed in the fuel gas system, the gas leak judgment unit referring to a gas leak judgment value based on pressure change in the closed space detected by the pressure sensor to judge the gas leak, and the judgment of fuel gas leak involving a varying of the gas leak judgment level in response to the nitrogen concentration in the fuel electrode.

In the same way as the method for judging fuel gas leak described above, this fuel cell system also takes into account the nitrogen concentration in the fuel electrode, an improvement in the fuel gas leak judgment precision being achieved by varying of the gas leak judgment level in response thereto. This fuel cell system also takes into account the temporary rise in the nitrogen concentration in the fuel electrode that occurs when the fuel cell is restarted, and performs a desired correction of the gas leak judgment value in response to this nitrogen concentration. In other words, it varies the gas leak judgment level. An underestimation of gas leak amount when a temporary high concentration of nitrogen exists in the fuel electrode side when the fuel cell is restarted due to the phenomenon of cross leak can be avoided by, as in the present invention, utilizing a gas leak judgment value in which the judgment level is varied.

This gas leak judgment in the fuel cell system takes into account the temporary rise in the nitrogen concentration in the fuel electrode that occurs when the fuel cell is restarted and involves varying of the gas leak judgment level in response to this nitrogen concentration, the gas leak judgment unit preferably varying the fuel gas leak judgment level by altering the gas leak judgment value.

In addition, the fuel cell system for gas leak judgment described above comprises stack temperature detection means for detecting the temperature of the fuel cell stack, fuel electrode pressure detection means for detecting the fuel electrode pressure, and leave time measurement means for measuring leave time, the estimation of nitrogen concentration in the fuel electrode being preferably estimated on the temperature of the fuel cell stack when operation of the fuel cell is stopped, the fuel electrode pressure when the fuel cell is restarted, and the leave time from when the operation of the fuel cell is stopped until it is restarted.

DETAILED DESCRIPTION

The configuration of the present invention will be described in detail hereinafter referring to an example of an embodiment thereof shown in the diagrams.

FIG. 1 to FIG. 6 shows one embodiment of the present invention. A fuel cell system 10 pertaining to the present invention is configured from a fuel cell (hereinafter referred to as a "fuel cell stack" and expressed by the symbol 20 in the diagram) that generates power upon being supplied with a fuel gas, a fuel gas line 3 for supplying and exhausting the fuel gas to and from the fuel cell stack 20, a pressure regulating valve provided in the fuel gas line 3, a pressure sensor for detecting pressure in the closed space formed in the fuel gas line 3, and a gas leak judgment unit for judging the gas leak in the closed space formed in the fuel gas line 3 (see FIG. 1). Furthermore, the fuel cell system 10 of this embodiment detects pressure change in the closed space formed in the fuel electrode side of the fuel cell, and refers to a predetermined gas leak judgment value based on the detected result of pressure change to judge fuel gas leak in the closed space.

The whole of the fuel cell system 10 pertaining to this embodiment will be hereinafter summarily explained. The configuration by which nitrogen concentration in the fuel electrode (hereinafter in the description this is referred to as the "fuel electrode nitrogen concentration") is estimated and the configuration by which the fuel gas leak in the closed space is judged will then be successively explained.

(Whole Configuration)

Figure 1:
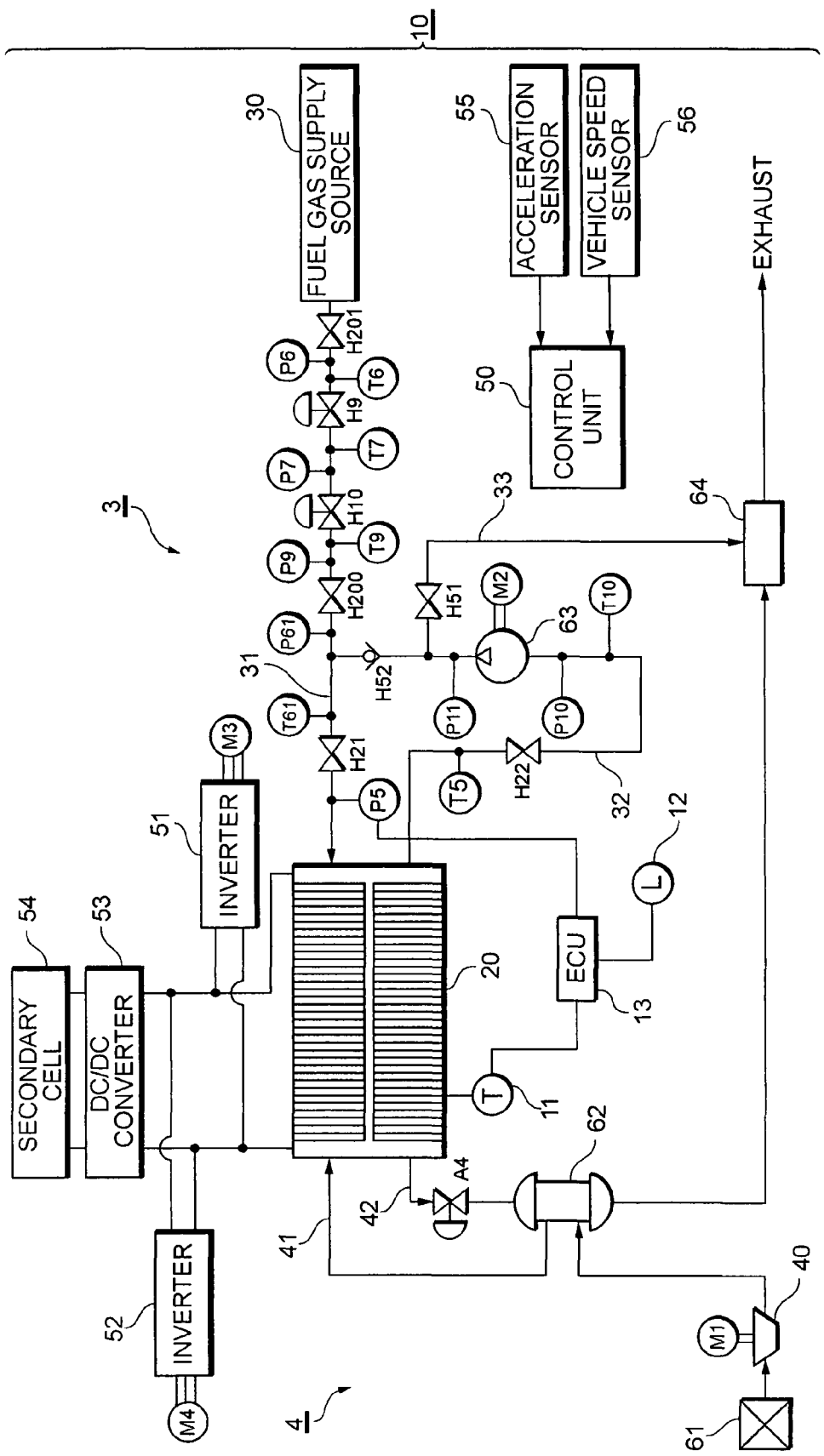
FIG. 1 is a block diagram of a fuel cell system of one embodiment of the present invention.

First, the fuel cell system 10 of this embodiment will be summarily explained. Notably, the fuel cell is sometimes expressed in the description that follows as "FC". FIG. 1 shows the schematic configuration of the fuel cell system 10 pertaining to this embodiment. While in the example shown here the fuel cell system 10 is employed as a vehicle-mounted power-generating system of a fuel cell vehicle (FCHV: Fuel Cell Hybrid Vehicle), it can of course also be employed as a power-generating system in a range of moving bodies (for example, ships and aeroplanes or the like), or in self-moving objects such as robots. The fuel cell stack (hereinafter also referred to as a "fuel cell stack" or simply "stack") 20 has a stack structure configured by stacking of a plurality of single cells in series and, for example, is configured as a solid polymer electrolyte-type fuel cell or the like.

In addition, the fuel cell system 10 of this embodiment comprises the fuel gas circulation supply line (referred to in the description as a "fuel gas line") 3 that is connected to the fuel cell stack 20 and an oxide gas supply line 4. The fuel gas line 3 supplies and exhausts fuel to and from the fuel cell stack 20 and, for example, in this embodiment constitutes a configuration that includes a fuel gas supply source 30, a fuel gas supply channel 31, the fuel cell stack 20, a fuel gas circulation channel 32 and an anode off-gas channel 33 (see FIG. 1).

The fuel gas supply source 30 is configured from, for example, a hydrogen storage source such as a high-pressure hydrogen tank or a hydrogen storage tank. The fuel gas supply channel 31 constitutes a gas channel for leading the fuel gas emitted from the fuel gas supply source 30 to an anode (fuel electrode) of the fuel cell stack 20, a tank valve H201, a high-pressure regulator H9, a low-pressure regulator H10, a hydrogen supply valve H200 and an FC inlet valve H21 arranged from upstream to downstream along this gas channel. The fuel gas compressed to a high pressure is decompressed to a medium pressure by the high-pressure regulator H9, and is further decompressed to a low pressure (normal operating pressure) by the low-pressure regulator H10.

The fuel gas circulation channel 32 constitutes a return gas channel for returning unreacted fuel gas to the fuel cell stack 20, and an FC outlet valve H22, a hydrogen pump 63 and a stopcock valve H52 are arranged upstream to downstream in this gas channel. The low-pressure unreacted fuel gas discharged from the fuel cell stack 20 is pressurized as appropriate by the hydrogen pump 63 and led to the fuel gas supply channel 31. The stopcock valve H52 suppresses backflow of the fuel gas from the fuel gas supply channel 31 to the fuel gas circulation channel 32. In addition, the anode off-gas channel 33 which branches from the fuel gas circulation channel 32 constitutes a gas flow channel for exhausting the hydrogen off-gas exhausted from the fuel cell stack 20 outside the system, and a purge valve H51 is arranged along this gas channel.

Moreover, the tank valve H201, hydrogen supply valve H200, FC inlet valve H21, FC outlet valve H22 and purge valve H51 described above constitutes shut valves for supplying or cutting off the fuel gas to the gas channels 31, to 33 or fuel cell stack 20. These shut valves are configured from, for example, a solenoid valve. As these solenoid valves, an ON/OFF valve or linear valve or the like in which the valve aperture is linearly regulated by, for example, a PWM control is ideal.

The configuration of the oxide gas supply line 4 of the fuel cell stack 20 includes an air compressor (oxide gas supply source) 40, an oxide gas supply channel 41, and a cathode off-gas channel 42 (see FIG. 1). Moreover, the air compressor 40 compresses air intaken from the atmosphere by way of an air filter 61, and supplies this compressed air to a cathode (oxygen electrode) of the fuel cell stack 20 as an oxide gas. Subsequent to being supplied for cell reaction in the fuel cell stack 20, the oxide off-gas flows along the cathode off-gas channel 42 and is exhausted outside the system. The oxygen off-gas exists in a highly moist state because it contains the moisture generated by the cell reaction in the fuel cell stack 20. A humidifier module 62 performs moisture exchange between a low-humidity state oxide gas flowing along the oxide gas supply channel 41 and the highly moist state oxygen off-gas flowing along the cathode off-gas channel 42 and humidifies the gas supplied to the fuel cell stack 20 as appropriate. The backpressure of the oxide gas supplied to the fuel cell stack 20 is regulated by a pressure regulating valve A4 arranged in proximity of a cathode outlet of the cathode off-gas channel 42. In addition, the cathode off-gas channel 42 is connected to a diluter 64 at the downstream side thereof. The anode off-gas channel 33 is connected to the diluter 64 in the downstream side thereof so that, following the mixed dilution of the hydrogen off-gas by the oxygen off-gas, the resultant gas is exhausted to the system exterior.

A power step-down of the direct current power generated by the fuel cell stack 20 is performed by a DC/DC converter 53 and used to charge a battery 54 (secondary cell). A traction converter 51 and an auxiliary inverter 52 convert the direct current power supplied from both or one of the fuel cell stack 20 and the battery 54 to an alternating current power and supply the alternating current power to each of a traction motor M3 and an auxiliary motor M4. Incidentally, the auxiliary motor M4 generically expresses a motor M2 for driving the later-described hydrogen-circulating pump 63 and a motor M1 for driving an air compressor 40 and so on and, accordingly, it sometimes functions as M1 and sometimes functions as M2.

A control unit 50 determines the power demanded by the system (sum total of vehicle drive power and auxiliary motor power) in accordance with accelerator aperture detected by an accelerator sensor 55 and vehicle speed detected by a vehicle speed sensor 56, and controls the system so that a fuel cell stack 20 matches the target power. More specifically, the control unit 50 regulates the oxide gas supply amount by regulating the number of revolutions of the motor M1 for driving the air compressor 40 and, in addition, regulates the fuel gas supply amount by regulating the number of revolutions of the motor M2 for driving the hydrogen pump 63. In addition, the control unit 50 controls the DC/DC converter 53 to regulate the operating points of the fuel cell stack 20 (output voltage, output current) and regulates the output power of the fuel cell stack 20 to ensure it matches the target power.

Pressure sensors P6, P7, P9, P61, P5, P10 and P11 for detecting the fuel gas pressure and temperature sensors T6, T7, T9, T61, T5 and T10 for detecting the fuel gas temperature are arranged in each of a high-pressure part (for example, segment from tank valve H201 to hydrogen supply valve H200), low-pressure part (for example, hydrogen supply valve H200 to FC inlet valve H21), FC part (for example, stack inlet valve H21 to FC outlet valve H22), and circulation part (for example FC outlet valve H22 to stopcock valve H52). In a more detailed description of the role of the pressure sensors, the pressure sensor P6 detects the fuel gas supply pressure of the fuel gas pressures supply source 30. The pressure sensor P7 detects the secondary pressure of the high-pressure regulator H9. The pressure sensor P9 detects the secondary pressure of the low-pressure regulator H10. The pressure sensor P61 detects the pressure of the low-pressure part of the fuel gas supply chart 31. The pressure sensor P10 detects the pressure on the input port side (upstream side) of the hydrogen-circulating pump 63. And the pressure sensor P11 detects the pressure of the output port side (downstream side) of the hydrogen-circulating pump 63.

Furthermore, fuel electrode pressure detection means for detecting the pressure of the anode (fuel electrode) is provided in the fuel cell system 10. For example, in this embodiment, a pressure gauge (hereinafter also referred to as a "pressure sensor") P5 provided as a sensor for detecting the pressure in the closed space formed in the fuel gas line 3 functions as fuel electrode pressure detection means. In order to detect the pressure in the above-described FC part (stack inlet valve H21 to FC outlet valve H22), the pressure sensor P5 of this embodiment is arranged between, for example, the stack inlet, or more specifically between the fuel cell stack 20 and FC inlet valve H21 (See FIG. 1). The pressure change in the closed space (the above-described FC part in the example of this embodiment) can be ascertained by detection thereof by the pressure sensor P5. In addition, the pressure sensor P5 is connected to an ECU 13, and it sends data related to the detected pressure value to this ECU 13 (See FIG. 1).

(Configuration for Estimation of Nitrogen Concentration)

First, the configuration necessary for estimating the intrinsic nitrogen concentration of the present invention will be described.

Figures 5, 6:
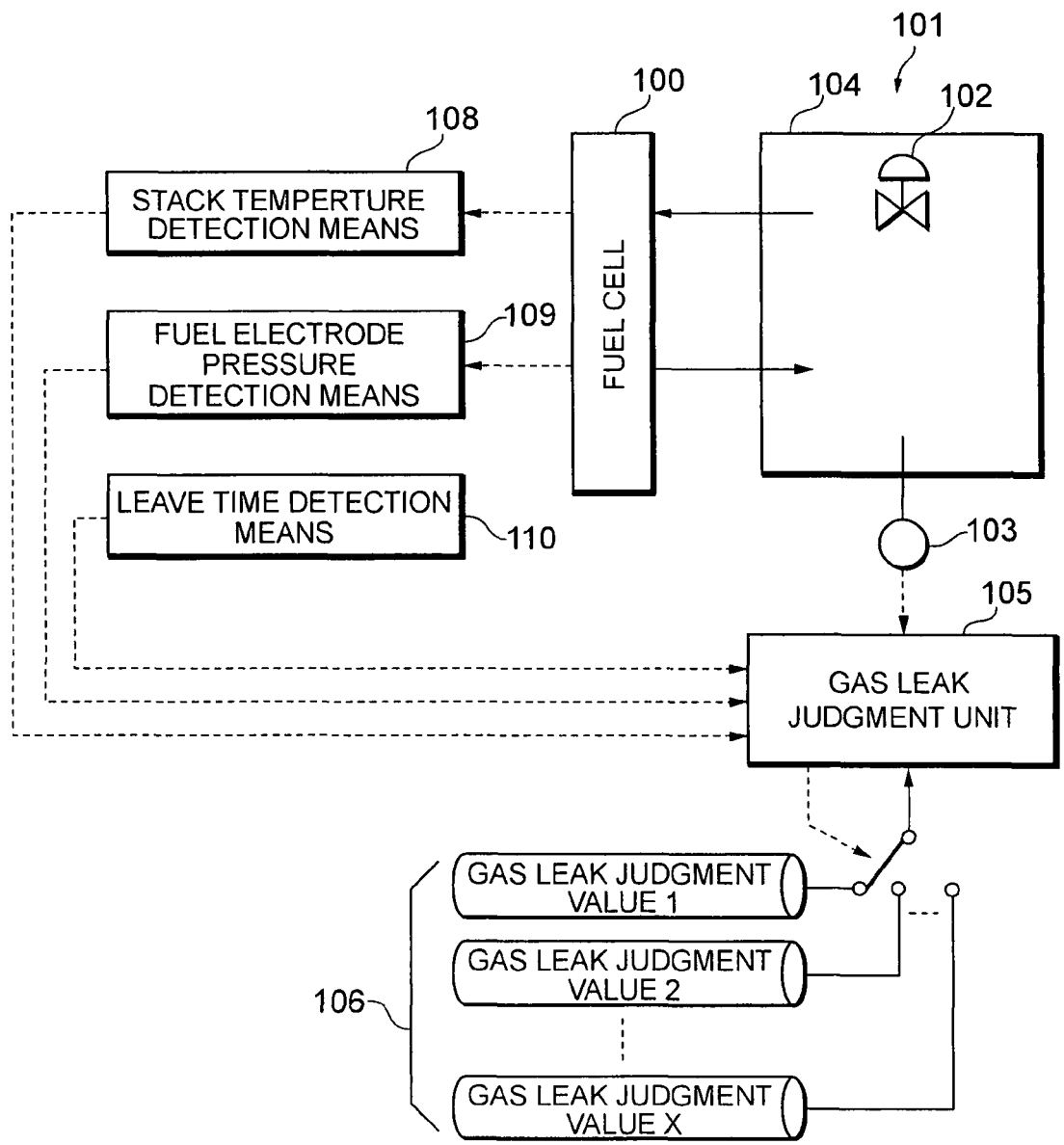
FIG. 5 is an example of a map in which the fuel gas leak judgment level is varied in response to the nitrogen concentration.
FIG. 6 is a function block diagram for gas leak judgment pertaining to the present invention.

FIG. 6 is a function block diagram for the gas leak judgment pertaining to the present invention.

The fuel cell system of the present invention comprises a fuel cell 100 for generating power upon being supplied with a fuel gas, a fuel gas line 101 for supplying and exhausting the fuel gas to and from the fuel cell 100, a pressure regulating valve 102 provided in the fuel gas line 101, a pressure sensor 103 for detecting the pressure in a closed space 104 formed in the fuel gas line 101, and gas leak judgment unit 105 for judging the gas leak in the closed space 104 formed in the fuel gas line 101. More particularly, the gas leak judgment unit 105 refers to gas leak judgment value 106 based on pressure change in the closed space 104 detected by the pressure sensor 103 to judge gas leak.

In other words, the fuel gas leak judgment involves varying of the fuel gas leak judgment level in response to the concentration of nitrogen in the fuel electrode. This takes into account the temporary rise in nitrogen concentration in the fuel electrode that occurs when the fuel cell is restarted, a desired correction being performed on the gas leak judgment value in response to this nitrogen concentration. The correction referred to here denotes the varying of the gas leak judgment level.

The gas leak judgment unit 105 preferably varies the fuel gas leak judgment level by altering the gas leak judgment value 106. That is to say, as shown in FIG. 6, the gas leak judgment unit 105 is configured to be able to alter the fuel gas leak judgment level based on selection of a plurality of gas leak judgment values 106 as appropriate.

Furthermore, the fuel cell system of the present invention preferably comprises stack temperature detection means 108 for detecting the temperature of the fuel cell stack, fuel electrode pressure detection means 109 for detecting the fuel electrode pressure, and leave time measurement means 110 for measuring the leave time. In this case, the gas leak judgment unit 105 performs an estimation of the concentration of nitrogen in the fuel electrode on the basis of the temperature of the fuel cell stack when the operation of the fuel cell is stopped, the fuel electrode pressure when the fuel cell is restarted, and the leave time from when the fuel cell is stopped until it is restarted.

Next, in the fuel cell system of this embodiment, the configuration correspondent to the function block diagram of the present invention described above for estimating the nitrogen concentration in the fuel electrode of the fuel cell stack 20 will be described.

As shown in FIG. 1, the anode nitrogen concentration in the fuel electrode stack 20 (nitrogen concentration in the anode notably including the amount that has reached the anode from the cathode having passed through the electrolyte film in the fuel cell stack 20) is estimated by the fuel cell system 10 of this embodiment which, as one example thereof for realizing this, describes a configuration that comprises stack temperature detection means 11 for detecting the temperature of the fuel cell stack (symbol 108 of FIG. 6), fuel electrode pressure detection means P5 for detecting the anode (fuel electrode) pressure (symbol 109 of FIG. 6), leave time measurement means 12 for measuring the leave time (symbol 110 of FIG. 6), and ECU 13 (symbol 105 of FIG. 6). The particulars of the configuration by which the anode nitrogen concentration is estimated, as well as the method for estimating the anode nitrogen concentration estimation method based thereon will be hereinafter described.

Stack temperature detection means 11 constitutes means for detecting the stack temperature of the fuel cell, in other words, the temperature of the fuel cell stack 20 (symbol 100 of FIG. 6), and is configured from a section for measuring temperature and a section for sending the information related to this measured temperature. For example, stack temperature detection means 11 of this embodiment is provided to detect the temperature of the fuel cell stack 20 and to send the data related to the detected temperature to the ECU 13 (see FIG. 1).

Leave time measurement means 12 constitutes means for measuring the leave time of the fuel cell stack 20, that is to say, the time from when the operation of the fuel cell is stopped until it is restarted and, for example, is configured from a timer (contains computer internal clock). Leave time measurement means 12 of this embodiment is connected to the ECU 13 (see FIG. 1) and is provided so as to start measuring leave time upon receiving a command signal from the ECU 13 and, furthermore, to finish measurement upon receiving a command signal from the ECU 13. Moreover, leave time measurement means 12 of this embodiment can also be designed to measure the time (ignition ON continuation time) from an ignition ON state when the ignition switch of the fuel cell stack 20 is switched ON to when the operation of the fuel cell stack 20 starts.

The ECU 13 constitutes control means configured from an electric controller (Electric Control Unit). The ECU 13 of this embodiment is connected to each of stack temperature detection means 11, leave time measurement means 12 and pressure fuel electrode pressure detection means P5 described above to acquire data related to stack temperature, leave time and fuel electrode pressure (anode pressure) and, based on this data, to estimate the anode nitrogen concentration (nitrogen concentration in the anode notably including the amount that has reached the anode from the cathode having passed through the electrolyte film). Moreover, although not specifically indicated in detail in FIG. 1, the ECU 13 is also connected to the control unit 50 whereupon, in response to the estimated anode nitrogen concentration, the output of the fuel cell stack 20 is restricted when required.

Figure 2:
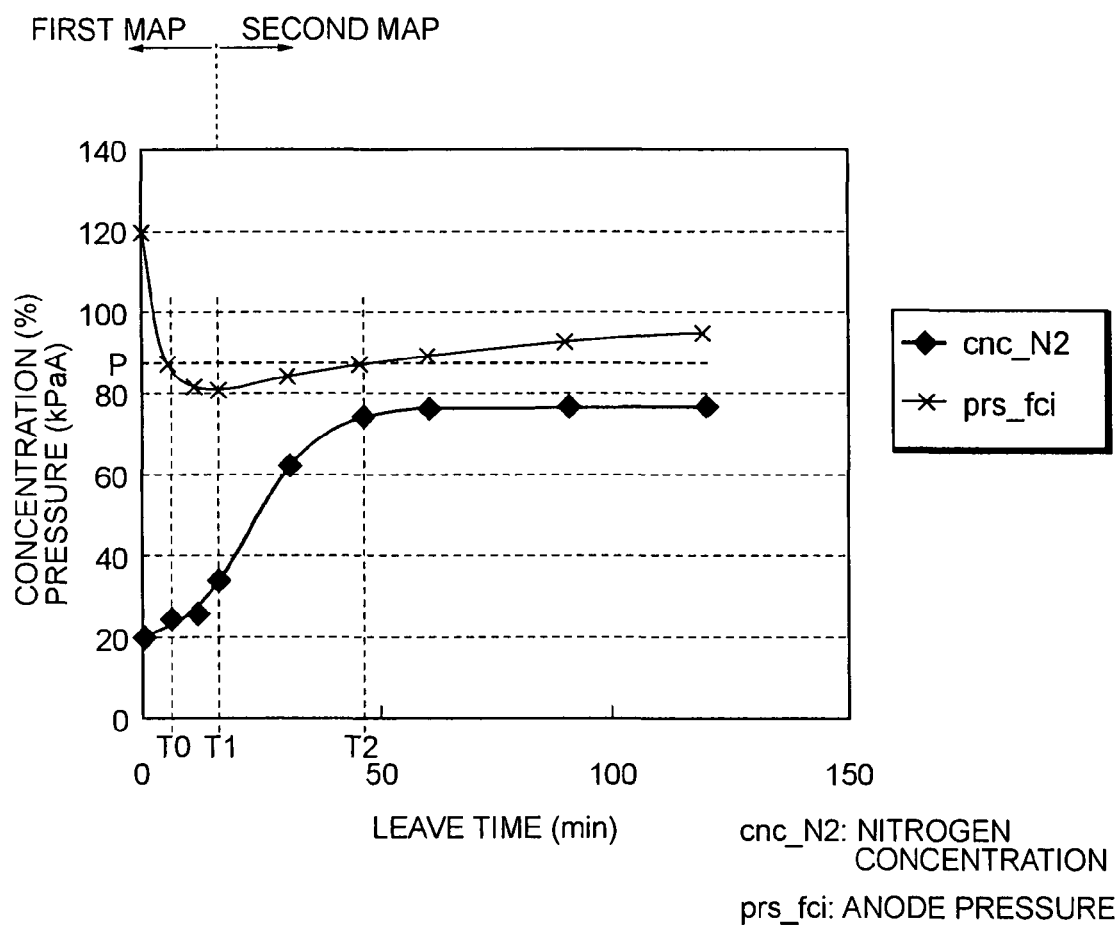
FIG. 2 is a map that expresses changes in the anode pressure and anode nitrogen concentration with respect to leave time at a stack temperature when operation of the fuel cell is stopped of 65° C.

Furthermore in this embodiment, a map expressing the relationship between the leave time and the anode pressure when operation of the fuel cell is stopped is prepared, and estimations of anode nitrogen concentration are based on this map. More specifically, as shown in FIG. 2, a map that expresses actual machine data, that is to say, the transition in anode pressure and anode nitrogen concentration with respect to leave time when the stack temperature when operation of the fuel cell is stopped is a predetermined temperature of, for example, 65° C., is prepared, and the anode nitrogen concentration is estimated on the basis of this map. Incidentally, the ♦ symbol in the map denotes anode nitrogen concentration (cnc_N2_, unit %), while the x symbol denotes anode pressure (prs_fci, unit kPaA). As shown in FIG. 2, the anode pressure value (prs_fci) denoted by x exhibits a change in which it temporarily drops rapidly when the operation of the fuel cell is stopped and, after reaching a minimum value, in other words, the negative pressure peak (in the actual machine data of FIG. 2, at around a little more than 80 kPaA) after the elapse of a time T1, gradually increases (the negative pressure referred to here uses the atmospheric pressure as a reference). On the other hand, the anode nitrogen concentration (cnc_N2) shown by the ♦ symbol exhibits a change in which it continues to increase throughout before gradually plateauing.

Here, for example, taking a pressure P (see FIG. 2) as a reference, as clear from FIG. 2 two types of time To, T2 (in other words, two types of leave time) are taken as leave times correspondent to this pressure P. In this case, if the estimated value of the anode nitrogen concentration (cnc_N2) is taken at a time prior to a time T1 at which the anode pressure reaches the negative pressure peak (To in FIG. 2), because the value is still increasing and constitutes an early stage value, measurement error is invited and, accordingly, a suitable control is not able to be performed. In this case, as means for suppressing the occurrence of measurement error, a means for taking the estimated value of the anode nitrogen concentration (cnc_N2) at a point after the time T1 at which the anode pressure reaches its minimum value (negative pressure peak) (elapsed time T2 in this embodiment) may be adopted. However, in this embodiment, a different means is adopted. That is to say, in this embodiment in which leave time is also measured, because it is simple to identify whether the leave time measured by leave time measurement means 12 occurs prior to or following the time T1 (time at which negative pressure peak is reached) by comparison with the map (FIG. 2) comprising actual machine data, the anode nitrogen concentration estimated value is determined subsequent to this identification. Because this eliminates a determining of the estimated value in the state prior to T1, in other words, in the so-called low nitrogen concentration state at a stage prior to the anode nitrogen concentration having increased sufficiently, measurement error is also eliminated.

(Explanation of Operation)

Figure 3:
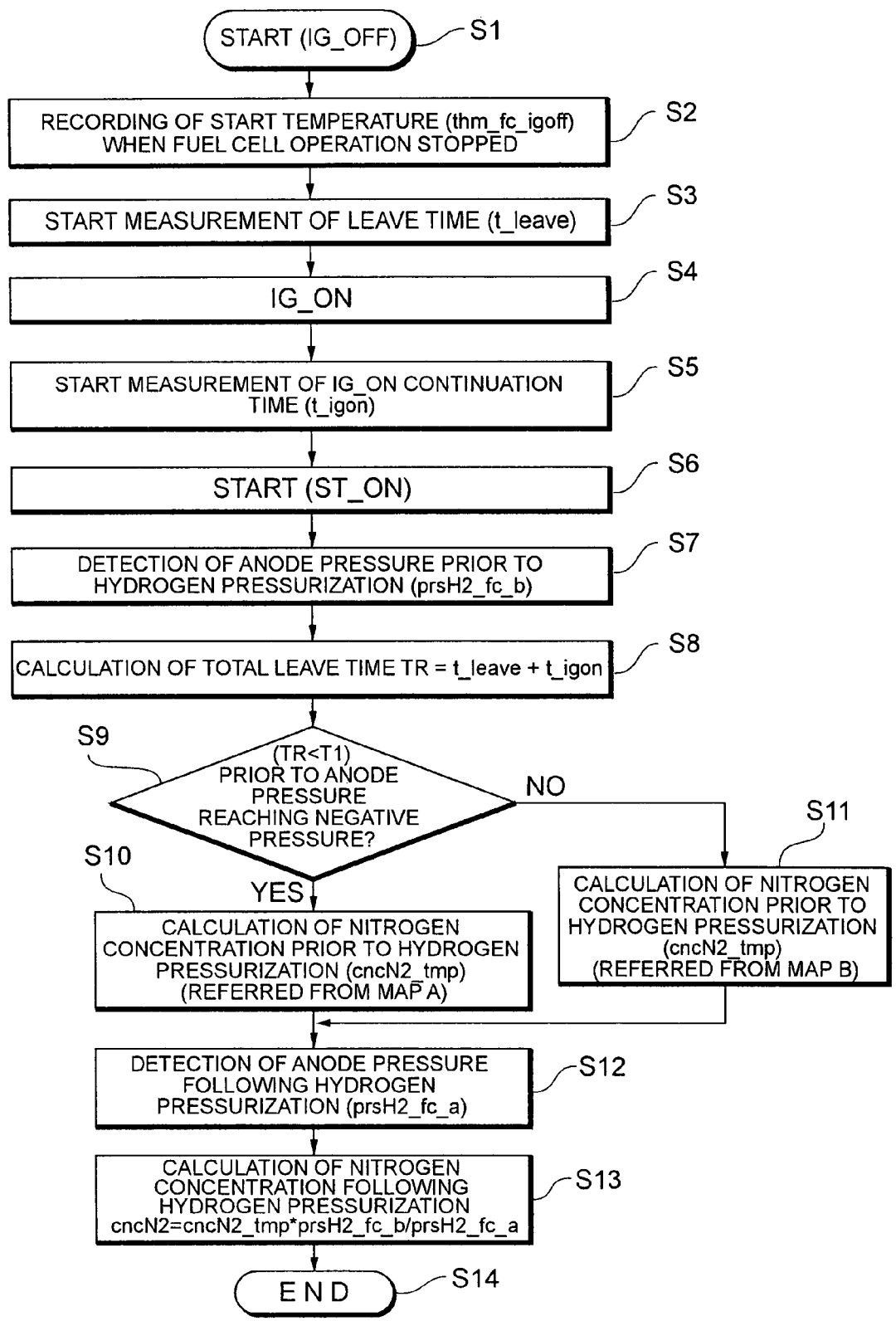
FIG. 3 is a chart showing the process flow of the estimation of anode nitrogen concentration in this embodiment.
Figure 4:
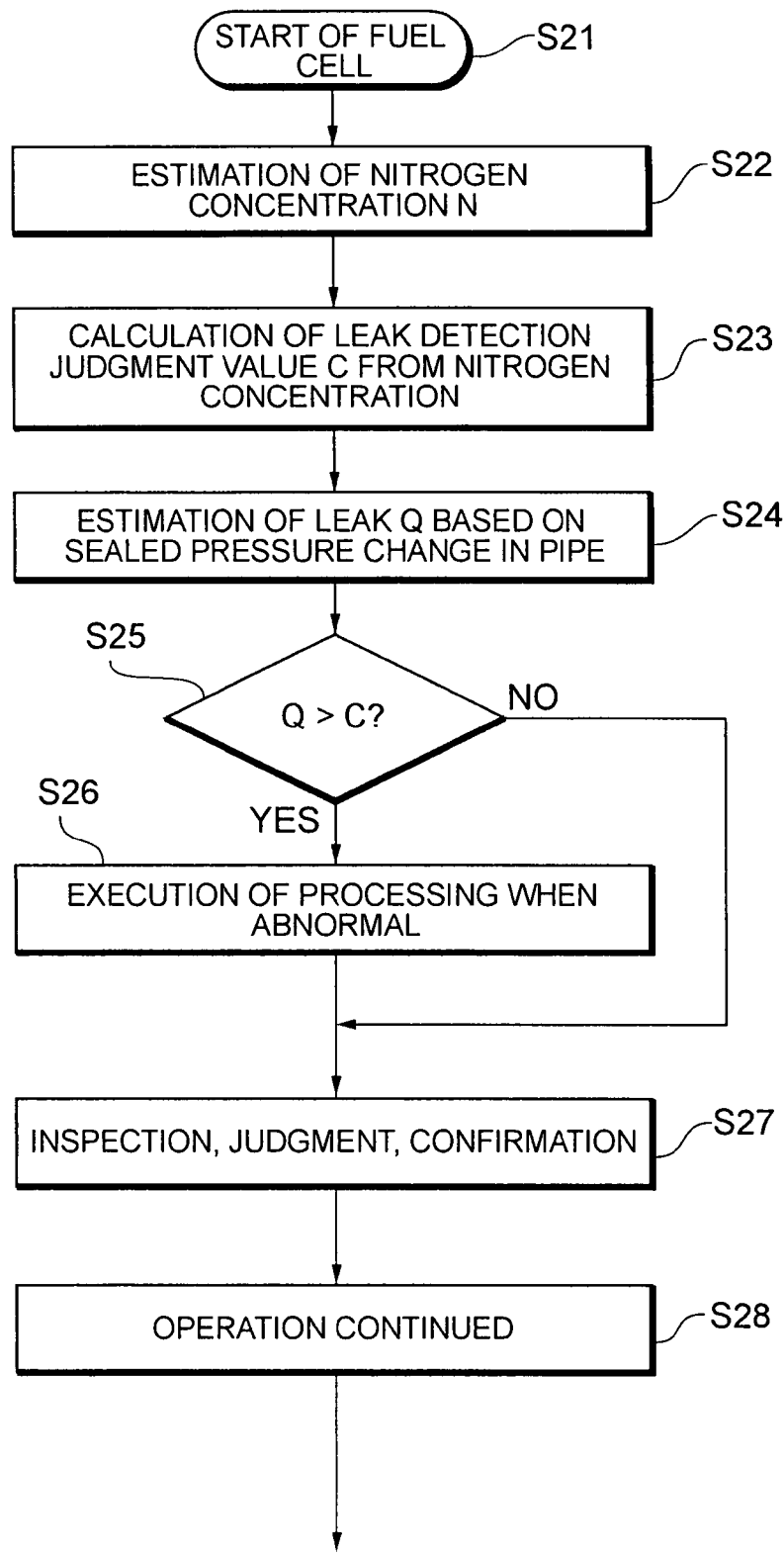
FIG. 4 is a chart showing the process flow of fuel gas leak judgment in this embodiment.

The process flow for estimating anode nitrogen concentration in this embodiment will now be described with reference to a chart (see FIG. 3).

First, the process flow for estimating anode nitrogen concentration in this embodiment starts as a result of the operation of the fuel cell being stopped by switching OFF of an ignition (IG_OFF) (Step 1). The temperature of the fuel cell stack when the fuel cell is stopped (thm_fc_igoff) is detected by stack temperature detection means 11 and this temperature is recorded in the ECU 13 (Step 2). Furthermore, the measurement of leave time (t_leave) is started (Step 3). In addition, when the ignition switch is switched ON (IG_ON state indicated as Step 4), the measurement of IG_ON measured time (t_igon) which is the time from when the ignition switch is ON until operation of the fuel cell stack 20 starts is started (Step 5).

Next, upon the fuel cell being restarted (ST_ON shown in Step 6), the anode pressure prior to hydrogen pressurization (prsH2_fc_b) is detected (Step 7). In this way, a total leave time TR, that is to say, the total of the "leave time (t_leave)" and "IG_ON continuation time (t_igon)" described above (TR=t_leave+t_igon) is calculated (Step 8).

Thereupon, based on the result calculated in this way, whether the total leave time TR is longer or shorter than the leave time T1, or to put this another way, a judgment of whether the timing of the restarting of the fuel cell stack 20 has occurred prior to the anode pressure reaching the negative pressure peak or instead has occurred after this peak has been reached is made. In a word, a judgment of the length of the total leave time TR and the leave time T1 is made (Step 9) and, if the leave time T1 is longer than the total leave time TR (TR<T1), the restart is judged to have occurred prior to the anode pressure reaching the negative pressure peak and the process moves to Step 10. In Step 10, referring to the map that expresses the anode nitrogen concentration prior to hydrogen pressurization, the anode nitrogen concentration (cncN2_tmp) prior to hydrogen pressurization is calculated (Step 10).

The map referred to here may be a map (see FIG. 2) configured from actual machine data itself as described above, and this map is preferably divided in advance into a first map for application in a first nitrogen state (for example, a low nitrogen concentration state) and a second map for application in a second nitrogen state of higher concentration than the first nitrogen state. For example, in this embodiment, the map is divided into a nitrogen concentration prior to hydrogen pressurization map A serving as a first map for expressing a low nitrogen concentration state (in FIG. 2 the curve changing over the time t=0~t (=T1)), and a nitrogen concentration prior to hydrogen pressurization map B serving as the second map for expressing a high nitrogen concentration state higher than the first nitrogen state (in FIG. 2 the curve beyond the time t=T1). Accordingly, when TR<T1 as described above, because the fuel cell stack 20 is restarted prior to the negative pressure peak having been reached, the anode nitrogen concentration is detected by reference to the map A that expresses the low nitrogen concentration state (Step 10). Once the anode nitrogen concentration (cncN2_tmp) has been detected prior to hydrogen pressurization in this way, the process moves to Step 12.

On the other hand, if the result of the judgment of the length of the total leave time TR and the leave time T1 in Step 9 is the opposite of the case described above, in other words, if the leave time T1 is less than the total leave time TR (TR>T1), the restart is judged to have occurred after the anode pressure has reached the negative pressure peak and the processing moves to Step 11. While Step 11 is the same as Step 10 in the point that the anode nitrogen concentration (cncN2_tmp) is calculated prior to hydrogen pressurization, in Step 11 reference is made to map B rather than to map A (see FIG. 2). Once the nitrogen concentration prior to hydrogen pressurization (cncN2_tmp) has been calculated, the process moves to Step 12.

Next, in Step 12, the anode pressure following hydrogen pressurization (prsH2_fc_a) is detected (Step 12). Thereupon, the nitrogen concentration following hydrogen pressurization (cncN2) is calculated (Step 13). As shown in FIG. 3, the value of the nitrogen concentration following hydrogen pressurization (cncN2) can be determined from the equation:

$$cncN2 = cncN2\_tmp * prsH2\_fc\_b / prsH2\_fc\_a,$$

in other words, by multiplying the nitrogen concentration prior to hydrogen pressurization (cncN2_tmp) and the anode pressure following hydrogen pressurization (prsH2_fc_b), and dividing this by the anode pressure following hydrogen pressurization (prsH2_fc_a). Thereupon, the series of processings is completed (Step 14).

In addition, it is preferable in the estimation of anode nitrogen concentration as described above for a technique for producing the maximum value anode nitrogen concentration if, during measurement of the leave time, the measurement time is cleared by leave time measurement means to be adopted. When the measurement time having been measured to a certain point is reset and cleared to 0 for some reason during measurement of leave time by leave time measurement means 12 (for example, when the auxiliary battery is removed), because the leave time measured by leave time measurement means 12 will be less than the original value and, in turn, a value lower than the actual value of the anode nitrogen concentration will be estimated, there is an inherent concern that a power generating failure due to hydrogen shortage will occur. If a dummy maximum value anode nitrogen concentration is used in such cases, at least the occurrence of a power generating failure due to hydrogen shortage as described above can be avoided. While various dummy values can be used, the anode nitrogen concentration value in this embodiment essentially plateaus and is a value approximately just under 80% of the maximum value. In addition, irrespective of whether the fuel cell stack 20 is in a leave state, the resetting of leave time measurement means 12 can be detected or judged by, for example, the ECU 13 described above.

Furthermore, it is preferable that means for recording the anode nitrogen concentration when the operation of the fuel cell is stopped be provided, and that the larger of the values of the anode nitrogen concentration value when the operation of the fuel cell is stopped and the anode nitrogen concentration (estimated value) when it is next started (when it is restarted) be used.

For example, when the fuel cell is temporarily stopped in a high anode nitrogen concentration state and then immediately restarted, irrespective of whether the anode nitrogen concentration has dropped significantly or not, similar to the case described above there is a concern that a value less than the actual value will be estimated and a power generating failure due to hydrogen shortage will occur.

To deal with this, as long as the anode nitrogen concentration when operation of the fuel cell is stopped is recorded and, subsequent to a comparison of the recorded value and the estimated value the higher value thereof is selected and adopted, at least the occurrence of power generating failure due to hydrogen shortage as described above can be avoided. In this embodiment the anode nitrogen concentration when operation of the fuel cell is stopped is recorded by the ECU 13 which, when required, compares this recorded value and the estimated value.

(Leak Judgment Operation)

Next, the configuration by which the fuel cell system 10 of this embodiment judges fuel gas leak in the closed space will be explained.

In the judgment of fuel gas leak in the closed space described above (in this embodiment, in the closed space formed in the fuel electrode side by the two pressure regulating valves of the stack inlet valve H21 and the FC outlet valve H22) by the fuel cell system 10 pertaining to this embodiment, pressure change in this space is detected, and the fuel gas leak is judged with reference to a predetermined gas leak judgment value on the basis of this pressure change. In this embodiment a desired correction is performed in accordance with need in response to the nitrogen concentration in the fuel electrode, in other words, a fuel gas leak judgment is made subsequent to a varying of the fuel gas leak judgment level. That is to say, because the nitrogen gas concentration in the closed space of the fuel gas line 3 rises temporarily when the fuel cell system 10 is restarted, the gas leak judgment level is varied in response to the nitrogen concentration taking this phenomenon into account.

For example, a gas leak judgment unit for varying the gas leak judgment level is provided in the fuel cell system 10 of this embodiment. The gas leak judgment unit refers to a gas leak judgment value based on pressure change in the closed space detected by a pressure sensor (fuel electrode pressure detection means) to judge the gas leak. In this embodiment, pressure change in the closed space in the fuel electrode side is detected by the pressure sensor P5, and the gas leak judgment unit judges gas leak on the basis of this detected result. Furthermore, the gas leak judgment unit varies the gas leak judgment level on the basis of the pressure detected result. Specific examples for varying the level in this way include adopting a set of gas leak judgment values established in response to pressure detected results without alteration, and employing a numerical value obtained by a calculation based on pressure detected results being substituted in an equation for expression the particulars of the level change.

While there are no particular restrictions to the specific apparatus that the gas leak judgment unit described above is configured from, in the fuel cell system 10 of this embodiment the ECU 13, to which the stack temperature detection means 11, leave time measurement means 12 and pressure sensor P5 described above are connected, may function as the gas leak judgment unit described above.

Next, an example of the process flow for fuel gas leak judgment in the closed space based on the configuration described above will be explained (see FIG. 4 and FIG. 5). For example, in this embodiment, a map describing the gas leak judgment values referred to for gas leak judgment is prepared as shown in FIG. 5. The map (MAP 1) shows one example of gas leak judgment values in which so-called gas leak reference values that describe fuel gas leak amounts judgment values) of, for example, 30, 25, 20, 15 and 10 C(L/min) when the nitrogen concentration N (%) is 0, 20, 40, 60 and 80% are established in advance (see FIG. 5). That is to say, in contrast to a conventional case in which a uniform gas leak judgment value (for example 30 (L/min)) is used regardless of the nitrogen concentration, this embodiment takes the nitrogen concentration in the closed space into account and employs a map in which the gas leak judgment values decrease correspondingly with increased nitrogen concentration. Moreover, when the nitrogen concentration is a value other than these values an interpolation as appropriate should be performed and, for example, in map (MAP 1), when the nitrogen concentration N (%) is 70 the fuel gas leak amount should be taken as 12.5 (L/min) and when 90 it should be taken as 7.5 (L/min).

The fuel gas leak judgment involves, first of all, subsequent to the fuel cell system 10 being started (Step 21 in FIG. 4), the nitrogen concentration in the closed space formed in the fuel electrode side being estimated (Step 22). The estimating of the nitrogen concentration in this embodiment involves estimation based on the temperature of the fuel cell stack 20 when the operation of the fuel cell is stopped, the pressure of the anode when the fuel cell is restarted, and the leave time from when the fuel cell is stopped until it is restarted for which the process flow (see FIG. 3) and the anode nitrogen concentration prior to hydrogen pressurization anode nitrogen concentration maps A, B (see FIG. 2) described above are used.

Once the nitrogen concentration in the closed space has been measured in this way, a leak-detecting judgment value C (L/min) correspondent to the nitrogen concentration estimated value N (%) is calculated with reference to the map described above (see MAP 1 of FIG. 5) (Step 23). For example, if the nitrogen concentration (estimated value) N is 20(%) the fuel gas leak judgment value C is 25(L/min), and if the nitrogen concentration (estimated value) N is 40(%) the fuel gas leak judgment value C is 20(L/min) (see FIG. 5). The gas leak judgment value C obtained by this calculation constitutes a judgment value or a reference value obtained by altering the judgment level in response to the nitrogen concentration (estimated value) in the closed space.

Once the gas leak judgment value C has been obtained after altering of the level (Step 23), the fuel gas leak is measured on the basis of the pressure change. That is to say, in this embodiment, the pressure change (sealed pressure in the sealed section of a pipe) of the closed space formed by two pressure regulating valves (FC inlet valve H21 and FC outlet valve H22) is detected by the pressure sensor P5, and a fuel gas leak amount Q is measured on the basis of this detected result (Step 24). Thereupon, the fuel gas leak amount Q and the gas leak judgment value C noted above are compared. If the result of this comparison is that the fuel gas leak amount Q<gas leak judgment value C, the fuel gas leak can be judged as being of a normal state (a state in which the extent of the gas leak is not regarded as a problem). In this case, because the judgment reflects a fuel gas leak judgment value that considers the nitrogen concentration (more specifically, a judgment value that is decreasingly altered as the nitrogen concentration increases), an underestimation of fuel gas leak in a state when a temporary rise in nitrogen concentration occurs is prevented.

On the other hand, if the result of the comparison of the fuel gas leak amount Q and the fuel gas leak judgment value C is that the fuel gas leak amount Q>gas leak judgment value C (Step 25), because the fuel gas leak amount Q is greater than the judgment value C which is employed as a reference, the extent of the leak of the fuel gas is judged as constituting a problem. This is judged as an abnormal case, and a processing applicable to an abnormal state is then executed (Step 26). Following execution of this processing, a further inspection and judgment of whether or not gas leak is occurring is carried out and, furthermore, a confirmation of predetermined items related to the start and operation of the fuel cell (Step 27) is carried out whereupon, if the problem is no longer evident, the operation is continued (Step 28). These steps are not peculiar to this subject application (see FIG. 4).

According to the hitherto explained fuel cell system 10 of this embodiment, even if a temporary rise nitrogen concentration in the fuel electrode side above that when the fuel cell is operated normally occurs when the fuel cell is restarted due to a cross leak phenomenon, an underestimation of the gas leak amount can be avoided by utilizing the previously explained corrected gas leak judgment value (in other words, a fuel gas leak judgment level set to a different level). This enables high-precision gas leak judgments to be made even when a temporary rise in the nitrogen concentration in the fuel electrode has occurred.

Moreover, while the embodiment described above constitutes one preferred mode of the present invention, the present invention should not be regarded as being restricted thereto and, accordingly, various changes may be made to the present invention within a range that does not depart from the gist thereof.

For example, while the explanation of this embodiment is of a mode that focuses on the nitrogen concentration in the fuel electrode of the fuel cell stack 20 and correction of gas leak judgment value C (in other words, varying of the fuel gas leak judgment level) in response to the nitrogen gas amount contained in the closed space of the fuel electrode side, embodiments of the present invention are not be to be understood as being restricted thereto. As another example thereof, if the hydrogen concentration and the hydrogen partial pressure are detectable in, for example, the fuel electrode side, the nitrogen concentration or the nitrogen gas amount may be determined on the basis of the detected results thereof. That is to say, if the nitrogen concentration is precisely detected or estimated with the phenomenon of temporary rise in the nitrogen concentration (or the nitrogen gas amount) in the fuel electrode side due to cross leak having been taken into account and these results are able to be reflected in fuel gas leak judgment reference values (a map), an even more precise leak judgment is possible.

In addition, while in this embodiment the fuel gas leak is judged in response to the anode pressure (pressure in the fuel electrode of the fuel cell stack 20), gas leak can be judged on the basis of other aspects such as, for example, the rate of change of the anode pressure (as examples thereof, the pressure gradient increase or pressure decrease gradient). That is to say, based on a trend in the pressure change characteristics when the fuel cell operation is stopped shown in the map of FIG. 2 for pressure gradient decrease prior to t=T1 and, on the other hand, the trend for pressure gradient increase after t=T1, judgment of gas leak based on a switchover of the maps at the point of shift of the pressure gradient from decrease to increase is possible.

The method for judging fuel gas leak of the present invention involves, upon a precise detection or estimation of nitrogen concentration focusing on the phenomenon of a temporary rise in the nitrogen concentration occurring in the fuel electrode side due to cross leak, a reflection of the result thereof in a form that involves varying of the judgment level employed for the fuel gas leak judgment. As a result, a high-precision gas leak judgment comparable to that when the fuel cell is being operated normally is possible when the fuel cell is restarted.

The method for judging fuel gas leak of the present invention takes into account the temporary rise in the nitrogen concentration in the fuel electrode that occurs when the fuel cell is restarted, and ensures high-precision gas leak judgment is possible by altering the gas leak judgment value in response to this nitrogen concentration.

According to the method for judging fuel gas leak of the present invention, the nitrogen concentration of the fuel electrode is estimated on the basis of one or both of the permeated amount of fuel gas and the leave time of the fuel cell, and a high-precision gas leak judgment is made possible on the basis thereof. While the existing situation is that estimation of nitrogen concentration from the permeated amount of the hydrogen gas to the air electrode is difficult because, in reality, the hydrogen permeation speed and the nitrogen permeation speed differ, the estimation of nitrogen concentration and judgment of gas leak described above are possible based on the present invention.

Furthermore, according to the method for measuring fuel gas leak of the present invention, the nitrogen concentration in the fuel electrode can be precisely estimated on the basis of the temperature of the fuel cell stack when operation of the fuel cell is stopped, the fuel electrode pressure when the fuel cell is restarted, and the leave time from when the fuel cell is stopped until it is restarted, a precise gas leak judgment being made possible on the basis thereof.

In addition, the fuel cell system described in the present invention also involves, upon a precise detection or estimation of nitrogen concentration focusing on the phenomenon of a temporary rise in the nitrogen concentration occurring in the fuel electrode side due to cross leak, a reflection of the result thereof in a form that involves varying of the judgment level employed for the fuel gas leak judgment. As a result, a high-precision gas leak judgment comparable to that when the fuel cell is being operated normally is possible when the fuel cell is restarted.

The fuel cell system of the present invention takes into account the temporary rise in the nitrogen concentration in the fuel electrode that occurs when the fuel cell is restarted, and ensures a high-precision gas leak judgment is possible by altering the gas leak judgment value in response to this nitrogen concentration.

In addition, according to the fuel cell system of the present invention, the nitrogen concentration in the fuel electrode can be precisely estimated on the basis of the temperature of the fuel cell stack when operation of the fuel cell is stopped, the fuel electrode pressure when the fuel cell is restarted, and the leave time from when the fuel cell is stopped until it is restarted, and a precise gas leak judgment is possible on the basis of these detected results.

I claim:

1. A method of fuel gas leak judgment in a fuel cell system, the method comprising:
    providing a fuel cell having a fuel electrode side and an air electrode side thereon;
    detecting a pressure change in a closed spaced formed in the fuel electrode side of the fuel cell;
    estimating a nitrogen concentration in a fuel electrode of the fuel cell based on a physical value related to the nitro concentration in the fuel cell;
    determining a fuel gas leak judgment value based on the detected pressure change, the gas leak judgment value corresponding to a gas leak in the closed space; and
    varying the fuel gas leak judgment value based on the estimated nitrogen concentration such that the gas leak judgment value is decreased with increasing estimated nitrogen concentration and is increased with decreasing nitrogen concentration.

2. The method of fuel gas leak judgment in a fuel cell system as claimed in claim 1, wherein the nitrogen concentration in the fuel electrode is estimated on the basis of at least one of:
a permeated amount of fuel gas that has permeated an electrolyte film of the fuel cell and leaked to the air electrode side, and
a leave time from when operation of the fuel cell is stopped until it is restarted.

3. The method of fuel gas leak judgment in a fuel cell system as claimed in claim 1, wherein the nitrogen concentration in the fuel electrode is estimated on the basis of:
a temperature of the fuel cell when operation of the fuel cell is stopped,
a pressure of the fuel electrode when the fuel cell is restarted, and
a leave time from when operation of the fuel cell is stopped until it is restarted.

4. A fuel cell system, comprising:
a fuel cell for generating power by being supplied with a fuel gas, the fuel cell including a fuel electrode;
a fuel gas system for supplying and exhausting fuel gas to and from the fuel cell;
a pressure regulating valve provided in the fuel gas system;
a pressure sensor for detecting pressure in a closed space formed in the fuel gas system; and
a gas leak judgment unit for judging a gas leak in the closed space formed in the fuel gas system,
wherein the gas leak judgment unit determines a gas leak judgment value based on the pressure change detected in the closed space by the pressure sensor, the gas leak judgment value corresponding to a gas leak,
wherein the gas leak judgment value is varied based on an estimated nitrogen concentration in the fuel electrode such that the gas leak judgment value is decreased with increasing estimated nitrogen concentration and is increased with decreasing nitrogen concentration,
wherein the nitrogen concentration in the fuel electrode is estimated on the basis of a physical value related to the nitrogen concentration in the fuel cell.

5. The fuel cell system as claimed in claim 4, comprising:
stack temperature detection means for detecting a temperature of a fuel cell stack in the fuel cell;
fuel electrode pressure detection means for detecting a pressure of the fuel electrode; and
leave time measurement means for measuring a leave time corresponding to a time from when operation of the fuel cell is stopped until the fuel cell is restarted,
wherein the estimated nitrogen concentration in the fuel electrode is based on the temperature of the fuel cell stack when operation of the fuel cell is stopped, the pressure of the fuel electrode when operation of the fuel cell is restarted, and the leave time from when operation of the fuel cell is stopped until it is restarted.

* * * * *

UNITED STATES PATENT AND TRADEMARK OFFICE
CERTIFICATE OF CORRECTION

PATENT NO. : 7,829,233 B2
APPLICATION NO. : 11/920701
DATED : November 9, 2010
INVENTOR(S) : Mikio Kizaki It is certified that error appears in the above-identified patent and that said Letters Patent is hereby corrected as shown below:

| Column | Line | |
|---|---|---|
| 1 | 53 | Change "it is was" to --it was--. |
| 1 | 66 | After "a hole occurring" insert --in--. |
| 13 | 29 | After "not" delete "be". |
| 14 | 53 | Change "spaced" to --space--. |
| 14 | 56 | Change "nitro" to --nitrogen--. |

Signed and Sealed this
Eighth Day of February, 2011

David J. Kappos
*Director of the United States Patent and Trademark Office*